Nov. 13, 1951  H. C. PIERCE  2,574,658
LADING BRACE FOR FREIGHT CARS
Filed Oct. 23, 1945  4 Sheets-Sheet 1

INVENTOR
HAROLD C. PIERCE,
BY
ATTORNEY

Nov. 13, 1951      H. C. PIERCE      2,574,658
LADING BRACE FOR FREIGHT CARS
Filed Oct. 23, 1945      4 Sheets-Sheet 2
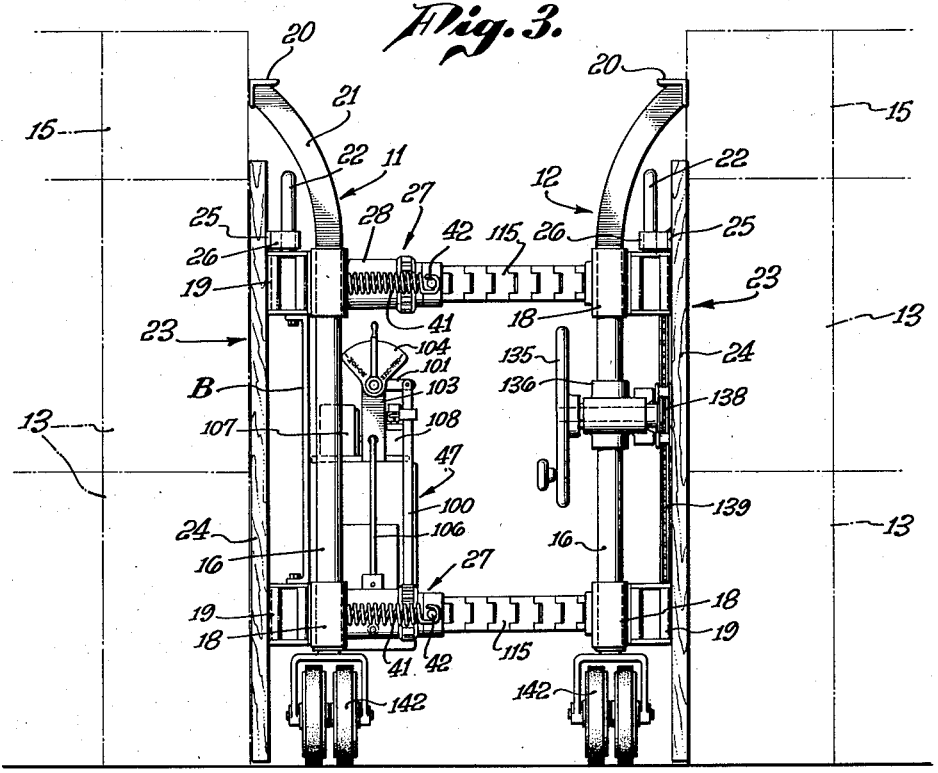
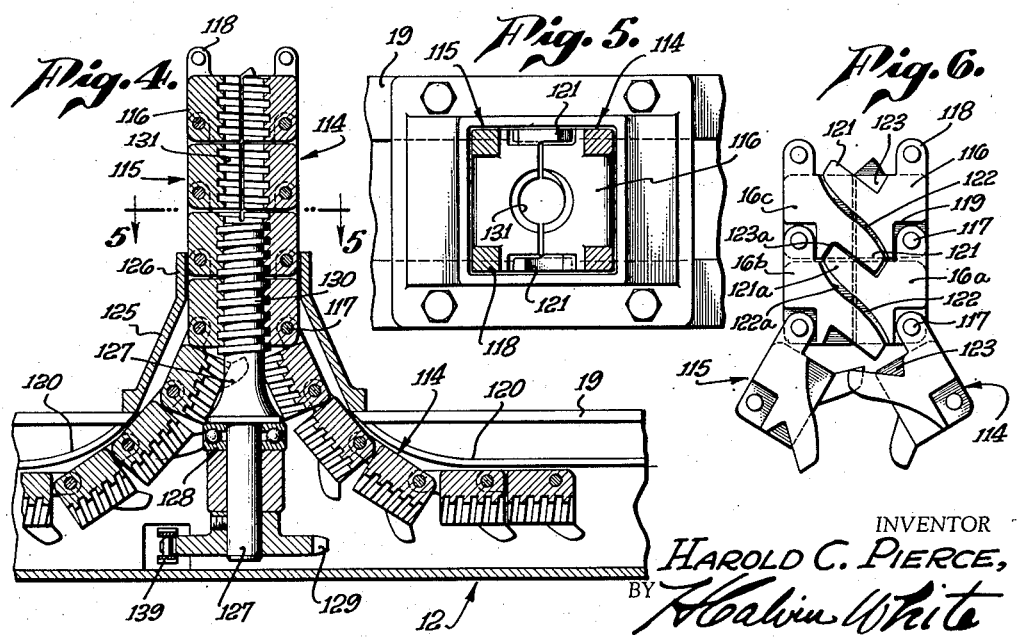
INVENTOR
HAROLD C. PIERCE,
BY
ATTORNEY

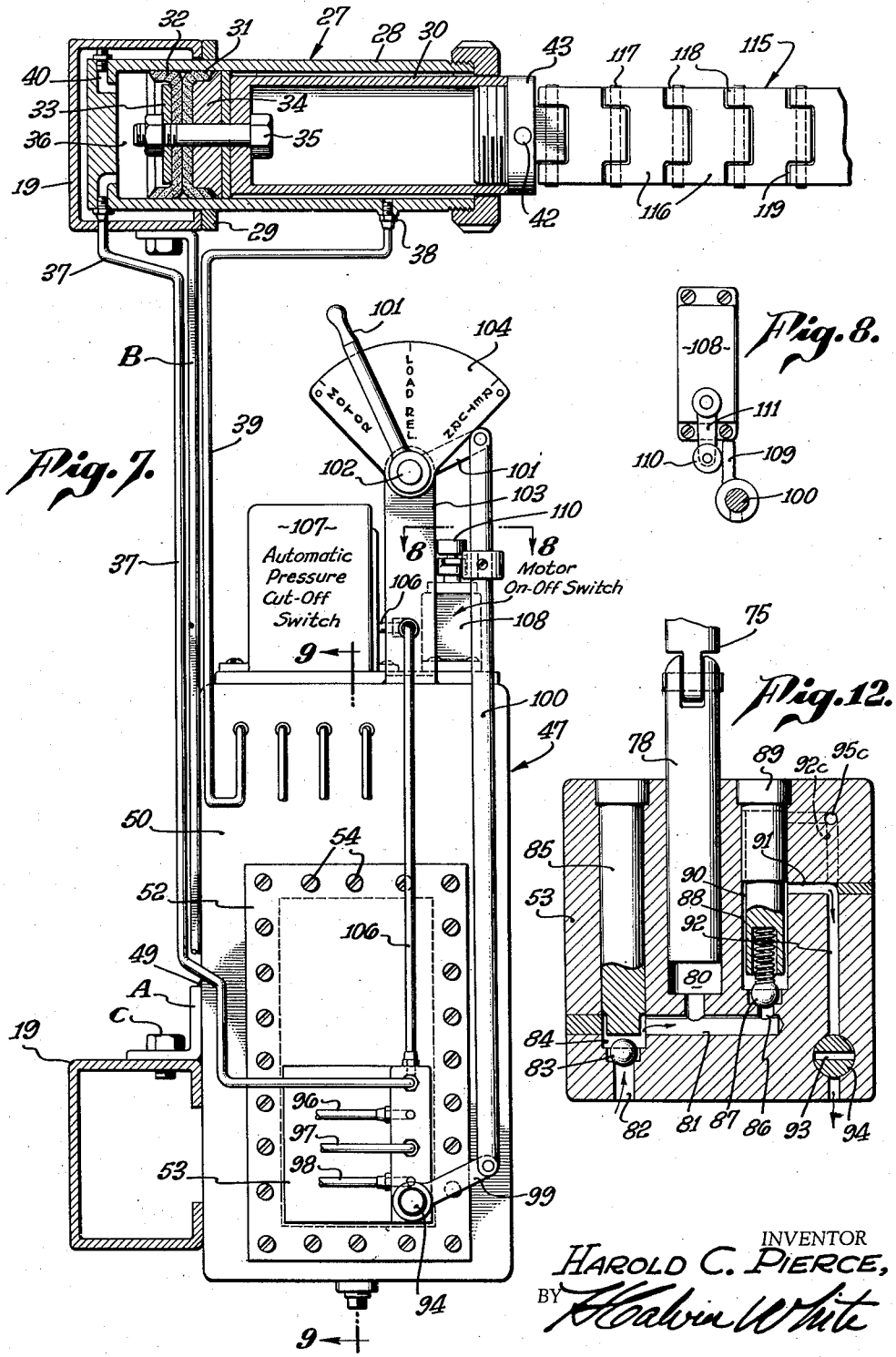

Nov. 13, 1951  H. C. PIERCE  2,574,658
LADING BRACE FOR FREIGHT CARS
Filed Oct. 23, 1945  4 Sheets-Sheet 4
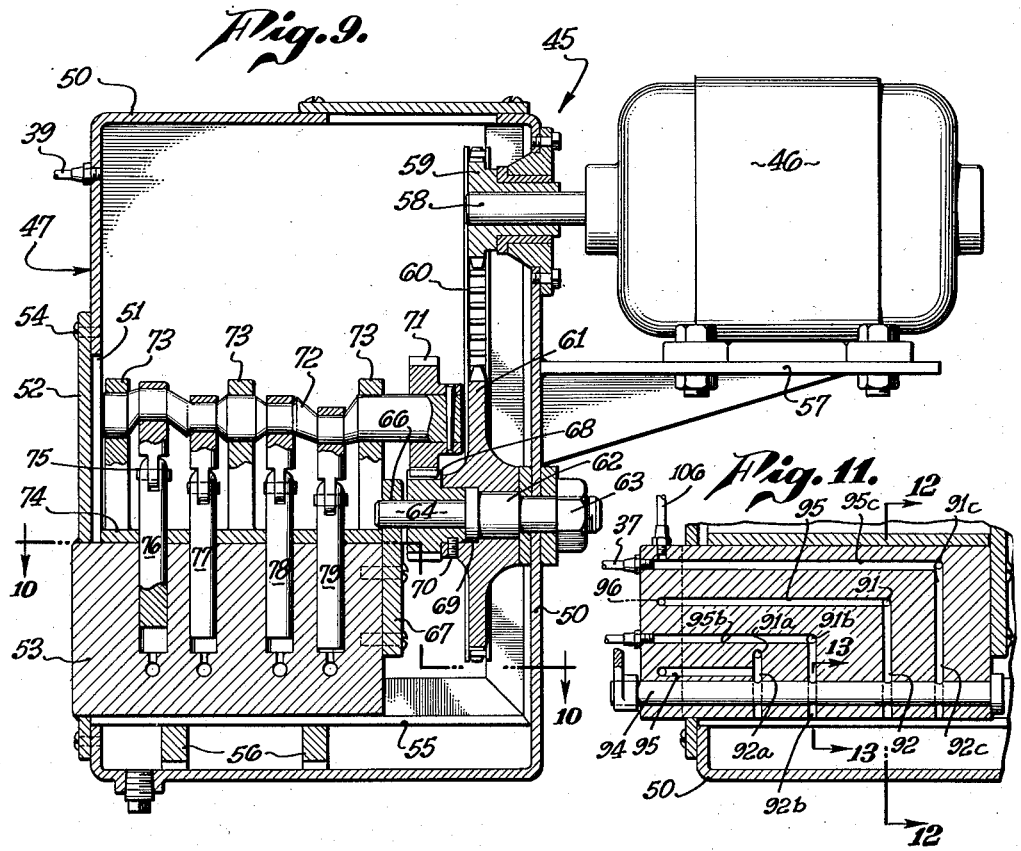
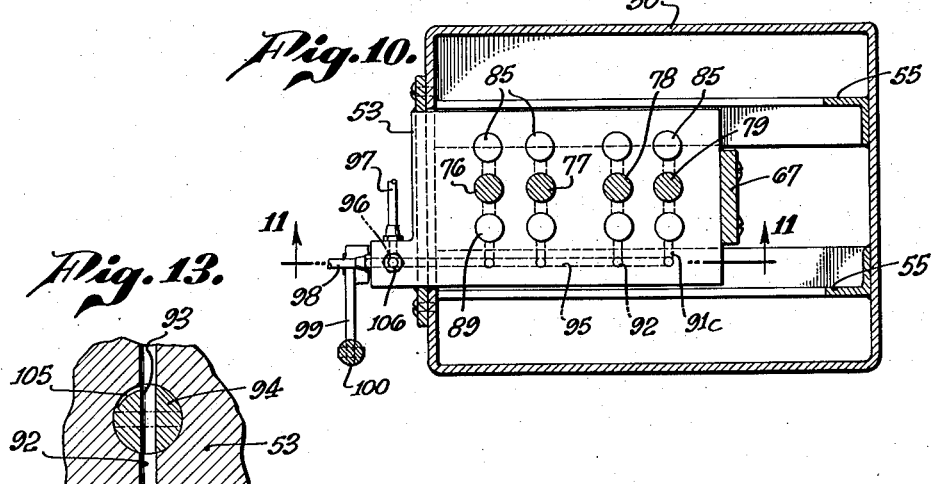
INVENTOR
HAROLD C. PIERCE,
BY
ATTORNEY Patented Nov. 13, 1951

2,574,658

UNITED STATES PATENT OFFICE 2,574,658

LADING BRACE FOR FREIGHT CARS

Harold C. Pierce, Pomona, Calif.

Application October 23, 1945, Serial No. 624,010

23 Claims. (Cl. 105—369)

This invention has to do generally with load displacing mechanisms, and more specifically of the general type used and known in the citrus industry as "car squeezes" for displacing box loads toward the ends of the refrigerator cars.

Citing the utility of the present mechanism for box load displacement in cars merely as illustrative of its various adaptations, the general mode of operation of the machine involves first placing it within a center space in the car between load sections filled in from the ends to the center space, and then causing the machine to displace and if desired squeeze or compress the load sections oppositely toward and against bulkheads at the ends of the car. Like prior equipment used for this purpose, the present machine embodies a frame structure having sections movable relatively together and apart, but unlike prior expedients used, the present machine incorporates various outstanding innovations with respect to the means for producing uniform relative movement of the frame sections and for applying most efficiently distributed compression forces to the load.

One major object of the invention is to provide for the expansion of the frame sections and application of pressures to the load at a plurality of locations, and with respect to each location by an individual power unit. The use of individual power units assures that the load engaging faces of the frame sections will remain parallel or in any other predetermined angular relationship during the load displacing process. Thus the boxes will be moved uniformly. Most desirably, though typically, the machine is built for individual pressure application to the load at four locations arranged in vertically spaced pairs, thus permitting direct and localized application of pressure to both the upper and lower portions of the loads, a matter of considerable importance in the displacement of divisible loads, e. g. multiple tier boxed produce loads.

Although the invention broadly contemplates application in this manner to the load of localized pressures by various specific types of mechanisms, it is found that the force application, pressure distribution and the control thereof may be effected to particular advantage by the use of fluid pressure or hydraulically actuated power units, individual in their respective effects and capable of pressure fluid supply and control from unitary sources and locations.

A further distinctive feature of the invention is the employment of novel force and movement transmitting means operable to produce relative movement of the frame sections under the influence of prime movers, which specifically in the present instance are a combination of manual and hydraulically powered operators. One outstanding and unique feature and advantage of the force transmitting means is its adaptability for accommodation in the machine with the frame sections brought together at minimum spacing, and the ability to spread apart the frame sections any distance desired. As will later appear, this feature is embodied in one or a plurality of normally flexible pairs of members, essentially chains, displaceable laterally for accommodation in and transversely of the machine, and adapted to be brought together in parallel and interlocked condition so as to constitute in effect a rigid force-transmitting member extensible throughout any distance corresponding to the common length of the chains.

The invention embodies various additional features and objects which will be most readily understood and appreciated without necessity for further preliminary discussion, from the following detailed description of the typical form of the invention shown in the accompanying drawing, and in which:

Fig. 3 is an end view taken from the left of Fig. 1;

Fig. 4 is a fragmentary enlarged cross-section on line 4—4 of Fig. 1;

Fig. 5 is an enlarged cross-section on line 5—5 of Fig. 4;

Fig. 6 is a fragmentary plan view of the flexible and interlocked thrust transmitting members;

Fig. 7 is an enlarged cross-section on line 7—7 of Fig. 1;

Fig. 8 is a cross-section on line 8—8 of Fig. 7;

Fig. 9 is a cross-section on line 9—9 of Fig. 7;

Fig. 10 is a section on line 10—10 of Fig. 9;

Fig. 11 is a section on line 11—11 of Fig. 10;

Fig. 12 is a cross-section on line 12—12 of Fig. 11; and

Fig. 13 is a fragmentary enlarged section on line 13—13 of Fig. 11.

Figure 1:
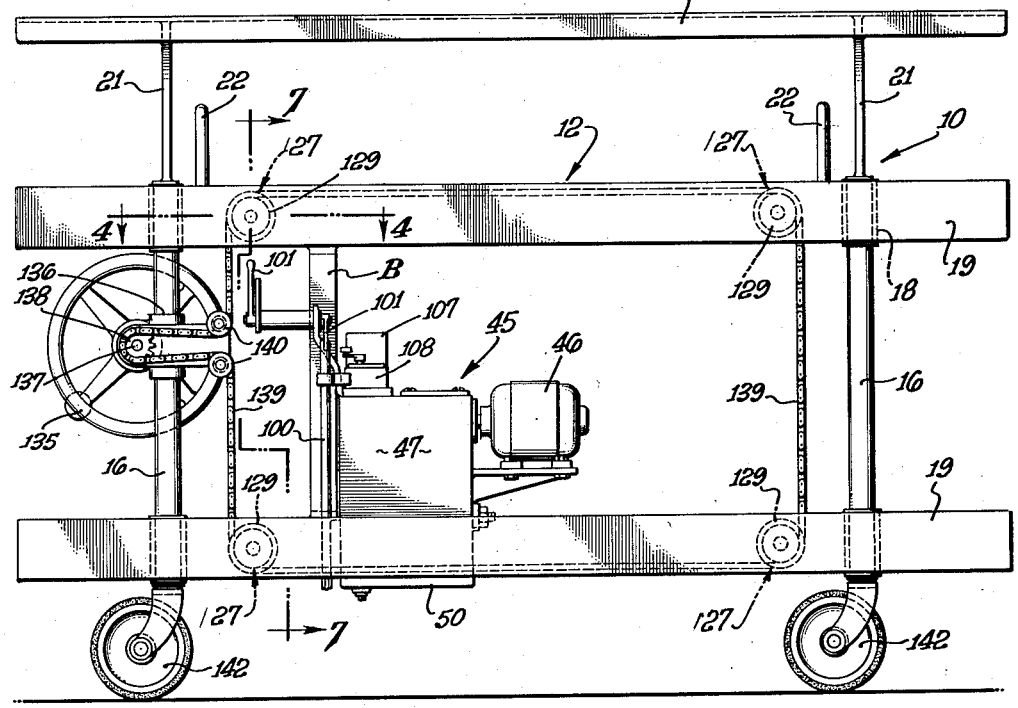
Fig. 1 is a side elevation of the machine with the hydraulic control parts appearing in the load release position.
Figure 2:
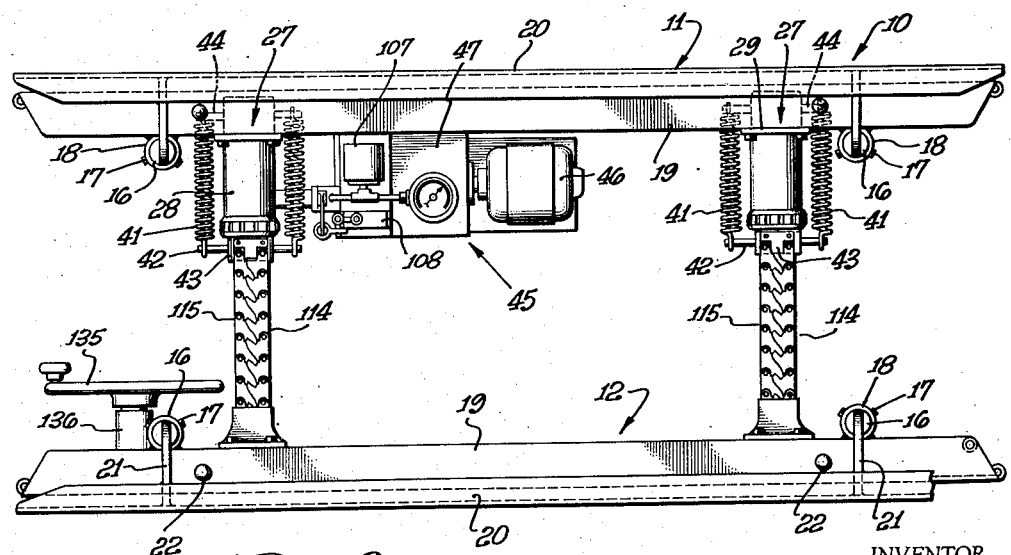
Fig. 2 is a plan view of Fig. 1.

Referring first to Figs. 1 to 3, the machine may be described generally as comprising a frame structure indicated at 10, including sections 11 and 12 movable relatively together and apart first to accommodate the machine to the load spacing, and then to displace individual or plural loads in accordance with the particular purpose for which the machine may be used. As indicated, the machine is designed particularly for displacing box produce or other loads in railroad cars, by interposing the machine between the load sections filled into the car from its ends toward the center. Thus as illustrated in Fig. 3, the work or load is shown conventionally to consist of citrus or other produce boxes 13 placed two tiers high on end in transverse rows filled into the car from its ends toward the center space 14, and a top tier of boxes 15 rested on their bottoms and extending transversely of the car.

Each of the frame sections 11 and 12 comprises two vertical members or pipes 16 to which are secured, as by set screws 17, sleeves 18 welded to or otherwise supporting the transverse channels 19 which may be interconnected by vertical braces B. As best illustrated in Fig. 7 each of the transverse members 19 is formed as an inwardly opening channel, continuous at its outer face for engagement against the load, and adapted to receive and accommodate various parts of the mechanism as will later appear. Upper transverse members 20 for engagement against the top tier of boxes 15, may be supported on arms 21 welded to the upper ends of members 16. Channels 19 carry handles 22 which may be used in moving and manipulating the machine, and which may also serve to support bulkheads, generally indicated at 23 only in Fig. 3, if the nature of the work or load makes the use of such bulkheads desirable. Each bulkhead 23 may comprise a transverse series of vertical members or boards 24 attached to a transverse supporting member 25 which carries tubular lugs 26 receiving and set down over the handles 22 to rest on the upper channels 19.

The frame sections 11 and 12 are forced relatively apart in their load displacing or squeezing operation by a plurality of individual power units 27, preferably consisting of four in number, arranged symmetrically in vertically spaced pairs, with the individual power units mounted on and at the inside of the channels 19, at locations of transverse spacing best suited for application and distribution of the displacing forces to the load. With the power unit arranged as illustrated, direct and individually applied forces are transmitted to the box tiers 13, and at locations transversely thereof, the upper power units also transmitting through the members 20 forces directly to the top tier 15. Because of numerous advantages, including the magnitude of forces transmittable, simplicity of construction and the facility and accuracy with which the control may be effected, the power units 27 preferably are of a fluid or hydraulic pressure actuated type, all receiving pressure fluid from a unitary pumping means, and all returning the fluid to common accumulator or supply source for the pumping means.

Referring to Fig. 7 (wherein one of the power units is shown in detail and from which the construction, operation and inter-relation of the others will be fully apparent), each of the units 27 comprises a cylinder 28 having its outer end received within the channel 19 and carrying a flange 29 bolted or otherwise secured to the inside face of the channel. The cylinder 28 contains a plunger 30, the inner end of which is sealed against fluid leakage as by a pair of cup leathers 31 and 32 clamped between the discs 33 and 34 by bolt 35. Pressure fluid is delivered to the chamber 36 for advancement of the plunger, and is displaced from the chamber on the return stroke of the plunger, through line 37 connecting with the later described pump. A side port 38 in the cylinder connecting with return line 39 limits advancement of the plunger in that application of the fluid pressure to the plunger is relieved when the sealed end of the plunger moves past the port 38, permitting fluid return through line 39 to the later described accumulator. At the time of charging the system with the pressure fluid, preferably a low viscosity oil, air may be withdrawn from the chamber 36 and connecting line through port 40, which thereafter is plugged as is shown. Advancement of the plunger 30 is resisted by a pair of coil springs 41, see Fig. 2, each connected at its outer end to a pin 42 extending through the head 43, at its inner end to a projection 44 on the side of the cylinder within the channel.

Delivery of pressure fluid to the individual units 27 is effected by a motor-driven pump assembly 45 attached or welded to an angle iron A bolted at C to the lower channel 19 of the frame section 11. Assembly 45 comprises a motor 46 driving a multiple piston pump 47 contained within a case 50 attached at 49 to the angle member A.

The pump structure 47 includes a case 50 having an end opening 51 closed by a plate 52 which is integral with the pump block 53 so that upon disconnection at 54 of the plate from the case, the block and associated parts of the pump may be withdrawn through the opening 51. The pump assembly is suitably supported in the case, as upon angle frames 55 and bottom transverse members 56, and as illustrated in Fig. 10 the pump block is spaced from the walls of the case 50 so that the latter serves as a reservoir or accumulator for the pressure fluid. The motor 46 is supported on a base 57 projecting from th end wall of the case 50 opposite the opening 51.

The motor shaft 58 extending into the case 50, carries a gear 59 driving by way of chain 60 a gear 61 rotatable on shaft 62 secured at its outer end by nut 63 to the case. The inner reduced end 64 of the shaft is journaled at 66 within the bearing or support 67 and carries a gear 68 received within counter-bore 69 of the gear 61, and secured thereto by screw 70. Gear 68 meshes with gear 71 on the overhead pump crank shaft 72 which is supported in the conventionally illustrated bearings 73 on plate 74. The shaft 72 comprises four crank sections each having the usual type of operating connection 75 with one of the pistons 76, 77, 78 and 79 reciprocable in vertical bores within the block 53. Through the described driving connections with the motor 46, the pistons (preferably though not necessarily of corresponding diameters) are operated at the same speed and displace fluid at the same rate, thereby causing the motion of the various power pistons 30 to be substantially identical. This causes the load engaging faces of the sections 11 and 12 to remain substantially parallel at all times.

Referring now to Fig. 12, each piston bore 80 communicates at its lower end with a separate transverse passage 81 into which the fluid is taken during the up stroke of the piston from the oil accumulator space below the block 53 through passage 82 past check valve 83 and into bore 84, the upper portion of which is closed by plug 85. On the piston down stroke the oil is displaced upwardly through passage 86 past the spring-seated check valve 87 into bore 88 closed at its upper end by plug 89 spaced at 90 within the bore to permit fluid delivery to passage 91. From the latter passage the oil discharges downwardly through passage 92 and port 93 in the valve 94 into the accumulator space when the valve is in open position, see Fig. 13. When the valve is closed, the delivery from passage 91 occurs through passage 95, see Fig. 11, to an outlet 96 connecting with a line corresponding to pipe 37 in Fig. 7, leading to one of the cylinders 30. Pistons 76, 77 and 79 similarly take into their bores fluid through separate valved passages corresponding to 81 and 82 in Fig. 2, and discharge the fluid through laterals 91a, 91b and 91c, corresponding to passage 91, and thence selectively under control of the valve 94 through passages 92a, 92b, and 92c, or through the longitudinal passages 95a, 95b and 95c, the latter connecting with line 37, and passages 95, 95b and 95a similarly connecting with lines 96, 97 and 98 leading like line 37 to the other three power units 27.

Valve 94 is connected by arm 99 with rod 100, see Fig. 7, which is pivotally connected at its upper end with the control crank lever 101 pivoted at 102 on a support 103 carrying the stationary indicator 104. With the lever thrown to the "motor" position, valve 94 is closed as in Fig. 12, and the pump pistons are delivering their full displacements to the power unit cylinders. In the "load release" intermediate position of the lever 101, the valve is in a position intermediate those of Figs. 12 and 13, in which restricted drainage of fluid from the power unit cylinders is permitted through lines 37, 96, 97, 98, and passages 92, 92a, 92b and 92c through clearance grooves 105 in the face of the valve 94. In the "return" position of lever 101, valve 94 is fully open to the Fig. 13 position permitting by-pass of fluid from the pump piston chambers back into the accumulator.

Passage 95c communicates through line 106 with a pressure responsive cut-off switch, conventionally illustrated at 107, electrically connected with the motor 46. Upon development of the pump pressure to a predetermined maximum, say in the neighborhoood of 400 pounds per square inch, switch 107 operates automatically to cut out and discontinue the motor operation. A second cut-off switch 108 is controlled in its operation in accordance with the position of the rod 100 and lever 101. Referring to Fig. 8, the rod carries an arm 109 engageable with a roller 110 on the switch arm 111 to open and close the cut-off switch 108. In the "load release" and "return" positions of the lever and rod, projection 109 is lowered below the roller 110, and the usual spring inside the switch 108 will have displaced the arm 111 counter-clockwise as viewed in Fig. 8 to open the switch and prevent operation of the motor. Upon elevation and lateral movement of rod 100 to the left as lever 101 is thrown to the "motor" position, projection 109 throws the switch arm 111 clockwise to close the switch and start the motor.

Referring to Figs. 2 to 6, each power unit plunger head 43 is connected to the frame section 12 by a pair of flexible members, generally indicated at 114 and 115, capable upon relative movement apart of the frame sections to be brought into interlocking relation so as to constitute in effect a rigid member, or plunger rod, for exerting upon advancement of the plunger, opposed thrusts against the frame sections. Further details of this type of power transmitting mechanism, will be found in my copending application Ser. No. 624,009, filed on even date herewith, entitled "Flexible Power Transmitting Mechanism." Each of the members 114 and 115 constitutes essentially a chain, comprising rigid links or segments 116 of identical form pivotally interconnected by pins 117 inserted through lugs 118 received within corner recesses 119 in both sides of adjacent links. At one end the link series are pivotally connected to the plunger head 43, and at their opposite ends the links diverge, as shown in Fig. 4, to be received within the channels 19 of frame section 12 adjacent the curved guides 120. Each link 116 carries on its opposite sides a projection 121 receivable within a recess 122 in the directly opposite link of the companion chain member, and received also within a surface recess 123 in the next link. Thus, referring to Fig. 6, projections 121a on opposite sides of link 16a enter, when the series 114 and 115 are brought together, recess 122a in opposite sides of link 16b to hold links 16a and 16b against relative displacement or substantial movement normal to the plane of the view; and the reception of the ends of projections 121a within recesses 123a similarly prevents corresponding relative movement between links 16a, 16b and 16c, and also prevents spreading apart of the links 16a and 16c, and therefore of the members 114 and 115 as a whole, through their parallel interengaged extents.

Members 114 and 115 are movable longitudinally relative to the guides 129 and also the guide housing 125, the inner end 126 of which confines the members to interlocked relation, by a screw shaft 127 extending through the thrust bearing 128 and carrying on its end a sprocket 129. The threaded portion 130 of the shaft engages corresponding thread segments 131 on the insides of the links 16 so that the rotation of the shaft 127 in one direction operates to project the convergent members 114 and 115 out through the guide 123, or reversely considered, to move the guide and frame section 12 away from section 11 and the interlocked extents of members 114 and 115. As illustrated in Fig. 6, movement convergently together of the chains into parallel relation and side-to-side engagement, automatically swings the link projections 121 of each chain into the described interlocking relation with the recesses in the links of the companion chain. Preferably the pivotal connections at 117 between the links are so positioned, or made sufficiently loose, that when interlocked, the successive links in each chain are in end-to-end engagement so that the thrust is transmitted to the box of the links independently of their interconnecting pins.

Suitable provision may be made for simultaneously rotating the shafts 127 to extend the interlocked portions of the flexible members 114 and 115 simultaneously and at the same rate. As illustrative, I show a hand wheel 135 supported on a mounting 136 applied to one of the frame columns 16, the wheel shaft 137 carrying a sprocket 138. An endless chain 139 trained over the sprocket passes between guide rollers 140 over each of the sprockets 129. By reverse rotation of the hand wheel 135, shafts 127 are correspondingly rotated to advance or retract the chain members, as the case may be, relative to the frame section 12.

In describing the operation of the machine, the latter may be assumed to be used as a box produce "car squeeze," as and for the purposes illustrated in Fig. 3. Being supported on casters 142 received within the train member 16, the machine initially is moved into the car center space 14 between the boxes and with the interlocking members 114 and 115 retracted within the channel 19 sufficiently to accommodate the machine within space 14 and with clearance between the frame section and boxes. After centering the machine with respect to the load, wheel 135 then may be rotated to advance the chains 114 and 115 sufficiently to spread the frame sections 11 and 12 into engagement with both portions of the box load. During this time, the control lever 101 will have been thrown to the "return" position, permitting relative movement of the frame sections without interference by the hydraulic system. In this position of the control lever, springs 41 retain the various plungers 30 in the retracted position of Fig. 7.

The control lever 101 then is thrown to the "motor" position to start operation of the motor as previously explained and cause fluid delivery by the pump pistons 76 to 79 to the four power unit cylinders 30. The resulting displacement of plungers 30 and the transmission of such displacement through the interlocked members 114 and 115 to the opposing frame section, results in the application of opposing thrusts against the two frame sections 11 and 12, spreading them apart and displacing and compressing the box loads from the center toward the ends of the car. (In the event the full desired displacement is not accomplished by one stroke of the plungers 30, the latter may be retracted by movement of lever 101 to the "load release" position, in which position the fluid pressure is slowly relieved to permit retraction of the plungers by springs 41. Members 114 and 115 may then be further advanced by operation of hand wheel 135 to take up any slack between the frame sections, and plungers 30 again hydraulically advanced to complete displacement of the load.) By then throwing the control lever to the "load release" position, retarded fluid displacement out of chambers 36 occurs through lines 37, 96, 97 and 98, and finally out through the valve recesses 105, so that pressure on the load is gradually released. By then throwing lever 101 to the "return" position, hand wheel 135 may be operated to retract chain members 114 and 115 sufficiently to permit withdrawal of the machine out of the car. Thus, the power pistons are operable to exert a relatively great hydraulic force in displacing the load outwardly, while the movable chain members permit manual variation of the range within which that hydraulic force may be exerted and further permit relative movement of the sections together for removal of the machine from the car.

I claim:

1. Load displacing apparatus of the character described comprising a frame having sections movable relatively apart to displace the load, fluid pressure actuated means operable to move said sections apart, and yielding means resiliently resisting such movement of the sections apart and operable to return said sections toward each other after their movement apart.

2. A car load squeeze of the character described comprising a frame having sections movable relatively apart to displace the load, individual power units acting against said sections at different locations to move them apart, and individual springs associated with said units respectively and resisting such movement apart of the sections.

3. A car load squeeze of the character described comprising a frame having sections movable relatively apart to displace the load, individual power units acting against said sections at different locations to move them apart, and means controllable independently of said units for moving said sections together.

4. Load displacing apparatus of the character described comprising a frame having sections movable relatively apart to displace the load, individual power units acting against said sections at different locations to move them apart, and means controllable independently of said units for applying directly at each of said locations forces acting to move said sections together.

5. Load displacing apparatus of the character described comprising a frame having sections movable relatively apart to displace the load, a plurality of frame displacing units each including a pair of flexible members having pivotally connected rigid segments and each adapted for flexure in only one direction from a straight line condition, manually actuated means for bringing together and advancing said members in side-by-side relation between said sections so as to move the sections apart, said members laterally supporting one another in said side-by-side relation to form a substantially rigid unit, means on said members interengageable by their movement together to progressively interlock and maintain the members against lateral separation, and fluid pressure actuated means for actuating the interlocked members to move said sections apart.

6. Load displacing apparatus of the character described comprising a frame having a pair of sections movable relatively apart to displace the load, manually operable mechanism for moving the sections apart, normally flexible series of interconnected relatively movable elements transformable progressively upon advancement of the series and by interlocking of the elements into a substantially rigid member extending between said sections, and power means operable to actuate said member to move said sections apart starting at any of different relative positions to which the sections initially may be moved by said manually operable mechanism.

7. Load displacing apparatus of the character described comprising a frame having a pair of sections movable relatively apart to displace the load, manually actuated mechanism operable in reverse directions to move the sections together and apart, normally flexible series of interconnected relatively movable elements transformable progressively upon advancement of the series and by interlocking of the elements into a substantially rigid member extending between said sections, and power means operable to actuate said member to move said sections apart starting at any of different relative positions to which the sections initially may be moved by said manually operable mechanism.

8. Load displacing apparatus of the character described comprising a frame having sections movable relatively apart to displace the load, individual power units acting against said sections at different locations to move them apart, each of said power units comprising a pair of members having normally flexible portions, means for advancing said members in side-by-side relation between said sections to move them apart, and means on said members engageable to progressively interlock upon advancement to maintain the members in substantially rigid condition, and control means for simultaneously actuating said members of all of said power units.

9. Load displacing apparatus of the character described comprising a frame having sections movable relatively apart to displace the load, individual power units acting against said sections at different locations to move them apart, each of said power units comprising a pair of members having normally flexible portions, manually operable means for advancing said members in side-by-side relation between said sections to move them apart, and means on said members engageable to progressively interlock upon advancement to maintain the members in substantially rigid condition, fluid pressure operated means for actuating the laterally supported members to move said sections apart, and control means for simultaneously actuating said members of all of said power units.

10. A car squeeze comprising a frame having a pair of upstanding sections movable relatively apart to displace the load, wheels supporting said sections for movement on a floor surface, individual fluid pressure actuated power units positioned between said sections at different locations and acting thereagainst at said locations to move the sections apart, individual means for supplying pressure fluid to each of said power units, and a common control operable to control the delivery of fluid from said individual fluid supply means to the corresponding power units substantially in unison.

11. A car squeeze comprising a frame having a pair of upstanding sections movable relatively apart to displace the load, wheels supporting said sections for movement on a floor surface, individual fluid pressure actuated power units positioned between said sections at different locations and acting thereagainst at said locations to move the sections apart, individual means for supplying pressure fluid to each of said power units, and a common control operable to control the delivery of pressure fluid to said individual power units and the discharge therefrom substantially in unison.

12. A car squeeze comprising a frame having a pair of upstanding sections movable relatively apart to displace the load, wheels supporting said sections for movement on a floor surface, individual fluid pressure actuated power units positioned between said sections at different locations and acting thereagainst at said locations to move the sections apart, individual pump units, individual valve means for controlling the delivery of fluid from said pump units respectively to the power units, and a common control for said valve means operable to actuate them substantially in unison to thereby control the delivery of fluid to said power units substantially in unison.

13. A car squeeze comprising a frame having a pair of upstanding sections movable relatively apart to displace the load, wheels supporting said sections for movement on a floor surface, individual fluid pressure actuated piston and cylinder units positioned between said sections at different locations and acting thereagainst at said locations to move the sections apart, individual pump units for supplying pressure fluid to each of said power units, individual valve means for controlling the delivery of fluid from said pump units to the corresponding piston and cylinder units and each operable selectively to either direct fluid from a pump unit to a piston and cylinder unit or permit the discharge of fluid from that piston and cylinder unit, and a common control for said valve means operable to actuate them substantially in unison to thereby control the delivery of fluid to said piston and cylinder units substantially in unison.

14. A car squeeze comprising a frame having a pair of upstanding sections movable relatively apart to displace the load, wheels supporting said sections for movement on a floor surface, individual fluid pressure actuated piston and cylinder units positioned between said sections at different locations and acting thereagainst at said locations to move the sections apart, individual pump units for supplying pressure fluid to each of said power units, means forming individual passages through which pressure fluid is conducted from said pump units to the piston and cylinder units, individual valves for controlling the discharge of pressure fluid from said passages and each operable to three control conditions, each of said valves acting in a first of said conditions to permit the discharge of fluid at a first rate from the corresponding passage to thereby permit retraction of the associated piston and cylinder unit, in a second condition to permit a relatively restricted discharge of fluid from the passage to permit a slower retraction of the piston and cylinder unit, and in the third condition to close off any discharge and thereby render the associated pump unit effective to actuate the piston and cylinder unit, and a common control for said valves operable to actuate them between said three conditions substantially in unison to thereby control the actuation of the piston and cylinder units substantially in unison.

15. Load displacing apparatus of the character described comprising a frame having a pair of upstanding sections movable relatively apart to displace the load, wheels supporting said sections for movement on a floor surface, individual piston and cylinder units positioned between said sections at different locations and acting thereagainst at said locations to move the sections apart, means forming individual fluid conducting passages leading to said cylinders respectively, and a pump comprising individual pistons operatively interconnected and each operating to deliver pressure fluid through only one of said passages to a respective one of said cylinders.

16. Load displacing apparatus of the character described comprising a frame having upstanding sections movable relatively apart to displace the load, wheels supporting the sections for movement on a floor surface, spaced power units interposed between said frame members and each including a pair of elongated interlockable members each comprising a series of rigid elements interconnected for flexure in one direction from a straight line condition and interengageable against flexure of the series in a reverse direction from said condition, said members being mounted for movement progressively into side-by-side relation between said sections and being adapted in said side-by-side relation to laterally support one another against said flexure and thereby form a substantially rigid unit, and means for advancing said members into said relation between said sections so as to move the sections apart.

17. Load displacing apparatus of the character described comprising a frame having upstanding sections movable relatively apart to displace the load, wheels supporting the sections for movement on a floor surface, spaced power units interposed between said frame members and each including a pair of elongated interlockable members each comprising a series of rigid elements interconnected for flexure in one direction from a straight line condition and interengageable against flexure of the series in a reverse direction, said members being mounted for movement progressively into side-by-side relation between said sections and being adapted in said side-by-side relation to laterally support one another against said flexure and thereby form a substantially rigid unit, means for advancing said members into said relation between said sections so as to move the sections apart, and power means for actuating said members to move the sections apart.

18. Load displacing apparatus of the character described comprising a frame having upstanding sections movable relatively apart to displace the load, wheels supporting the sections for movement on a floor surface, spaced power units interposed between said frame members and each including a pair of elongated members having pivotally connected rigid segments and each adapted for flexure in only one direction from a straight line condition, means for advancing said members in side-by-side relation between said sections so as to move the sections apart, said members laterally supporting one another against said flexure in said side-by-side relation to form a substantially rigid unit, and means on said segments engageable to progressively interlock upon said advancement to maintain the members against lateral separation.

19. Load displacing apparatus of the character described comprising a frame having sections movable relatively apart to displace the load, wheels supporting the sections for movement on a floor surface, spaced power units interposed between said frame members and each including a pair of elongated members having pivotally connected rigid segments and each adapted for flexure in one direction from a straight line condition, a screw rotatable between and engaging thread segments on said members to advance them in side-by-side relation and thereby move said sections apart, said members laterally supporting one another against said flexure in said side-by-side relation to form a substantially rigid unit, and means on said members engageable to progressively interlock upon said advancement to maintain the members against lateral separation.

20. Load displacing apparatus of the character described comprising a frame including a pair of sections movable relatively apart to displace the load, a plurality of power units each including an actuating element mounted for powered movement relative to a first one of said sections and acting against the second section to move it away from the first, and a jack mechanism controllable independently of the powered movement of said actuating element and forming an adjustable length connection between the actuating element and said second section.

21. Load displacing apparatus of the character described comprising a frame including a pair of sections movable relatively apart to displace the load, a plurality of fluid pressure actuated power units each carried by a first one of said sections and including a power piston movable relative to said first section and acting against the second section to move it away from the first, and a jack mechanism manually controllable independently of the powered movement of said piston and forming an adjustable length connection between the piston and said second section.

22. A car squeeze comprising a frame including a pair of upstanding sections movable relatively apart to displace the load, wheels supporting said sections for movement on a floor surface, a plurality of individual power units carried by one of said sections at a plurality of different locations and each including an actuating element mounted for powered movement relative to said first section and acting against the second section to move it away from the first, a plurality of individual jack mechanisms controllable independently of said powered movement of the actuating elements and forming adjustable length power transmitting connections between the actuating elements respectively and said second section, means for actuating said elements in unison to move the sections apart, and manually operated means for actuating said jack mechanisms in unison and independently of said actuation of the elements.

23. A car squeeze comprising a frame including a pair of upstanding sections movable relatively apart to displace the load, wheels supporting said sections for movement on a floor surface, a plurality of fluid pressure actuated power units carried by a first one of said sections at a plurality of different locations and each including a power piston movable relative to said first section and acting against the second section to move it away from the first, a plurality of individual jack mechanism controllable independently of said powered movement of the pistons and forming adjustable length power transmitting connections between the pistons respectively and said second section, individual pumps for supplying pressure fluid to each of said power units, a common control for said power units operable to control the delivery of fluid from the pumps to the corresponding power units substantially in unison to thereby actuate the power units substantially in unison, and manually operated means for actuating said jack mechanism in unison and independently of said actuation of the pistons, each of said jack mechanisms including a pair of elongated members connected at one end to the corresponding piston and acting against said second section at a location opposite the piston, said members including a series of rigid elements interconnected for flexure in one direction from a straight line condition and being interengageable against flexure of the series in an opposite direction, means for progressively advancing said members into side-by-side positions of extension between the sections, said members being adapted to laterally support one another against said flexure and form a rigid force transmitting member in said side-by-side positions.

HAROLD C. PIERCE.

REFERENCES CITED

The following references are of record in the file of this patent:

UNITED STATES PATENTS

| Number | Name | Date |
| --- | --- | --- |
| 1,136,934 | Camp | Apr. 27, 1915 |
| 1,391,624 | Gardner | Sept. 20, 1921 |
| 1,577,040 | Larson | Mar. 16, 1926 |
| 1,834,900 | Holmes | Dec. 1, 1931 |
| 2,086,283 | Pierce | July 6, 1937 |
| 2,114,565 | Kovach | Apr. 19, 1938 |
| 2,148,543 | Dinzl | Feb. 28, 1939 |
| 2,252,283 | Brase | Aug. 12, 1941 |
| 2,337,573 | Schultz | Dec. 28, 1943 |
| 2,346,676 | Hair et al. | Apr. 18, 1944 |
| 2,424,768 | Nalbandian | July 29, 1947 |